(12) United States Patent
D'Amico et al.

(10) Patent No.: US 8,604,740 B2
(45) Date of Patent: Dec. 10, 2013

(54) POWER SUPPLY AND CONTROL UNIT, PARTICULARLY FOR SUBMERSED ELECTRIC MOTORS

(75) Inventors: Sebastiano D'Amico, Vicenza (IT); Andrea Fongaro, Altavilla Vicentina (IT)

(73) Assignee: Ebara Corporation, Tokyo (JP)

( * ) Notice: Subject to any disclaimer, the term of this patent is extended or adjusted under 35 U.S.C. 154(b) by 282 days.

(21) Appl. No.: 12/998,355

(22) PCT Filed: Sep. 30, 2009

(86) PCT No.: PCT/EP2009/007018
§ 371 (c)(1),
(2), (4) Date: Apr. 11, 2011

(87) PCT Pub. No.: WO2010/043310
PCT Pub. Date: Apr. 22, 2010

(65) Prior Publication Data
US 2011/0199037 A1    Aug. 18, 2011

(30) Foreign Application Priority Data
Oct. 15, 2008    (IT) ............................... VI2008A0242

(51) Int. Cl.
*H02P 1/30*    (2006.01)
*H02P 3/00*    (2006.01)

(52) U.S. Cl.
USPC ............. 318/503; 318/16; 318/560; 318/721; 417/423.11; 417/414; 166/250.13

(58) Field of Classification Search
USPC ........................ 318/560, 561, 721, 16, 503; 417/423.11, 414; 166/244.1, 369, 166/250.13, 250.15
See application file for complete search history.

(56) References Cited

U.S. PATENT DOCUMENTS

| | | | |
|---|---|---|---|
| 2,970,232 A | 1/1961 | Kilbourne | |
| 4,908,757 A | 3/1990 | Jensen et al. | |
| 6,167,965 B1 * | 1/2001 | Bearden et al. | 166/250.15 |
| 6,201,327 B1 | 3/2001 | Rivas | |
| 6,688,860 B2 * | 2/2004 | Du et al. | 417/423.11 |
| 6,981,853 B2 * | 1/2006 | Du et al. | 417/414 |
| 7,217,107 B2 * | 5/2007 | Du et al. | 417/414 |
| 7,487,838 B2 * | 2/2009 | Knight et al. | 166/369 |
| 7,635,030 B2 * | 12/2009 | Knight et al. | 166/369 |
| 7,699,102 B2 * | 4/2010 | Storm et al. | 166/244.1 |
| 7,878,242 B2 * | 2/2011 | Gray | 166/250.13 |
| 2002/0192090 A1 * | 12/2002 | Du et al. | 417/423.11 |
| 2004/0136849 A1 * | 7/2004 | Du et al. | 417/423.11 |

(Continued)

FOREIGN PATENT DOCUMENTS

| | | |
|---|---|---|
| GB | 2 199 203 | 6/1998 |
| JP | 59 089543 | 5/1984 |

(Continued)

*Primary Examiner* — Paul Ip
(74) *Attorney, Agent, or Firm* — R. Neil Sudol; Coleman Sudol Sapone, P.C.

(57) ABSTRACT

A power supply and control unit for submersed electric motors includes an enclosure which is jointly connected to the motor of a submersed electric pump and forms a hermetic chamber that contains an electronic power supply that can be connected to the motor. The unit includes a heat exchange means in the liquid state that completely fills the empty space within the hermetic chamber in order to transfer to the enclosure the heat generated by the electronic power supply.

16 Claims, 4 Drawing Sheets

(56) References Cited

U.S. PATENT DOCUMENTS

| | | | |
|---|---|---|---|
| 2005/0167096 A1* | 8/2005 | Du et al. | 166/105 |
| 2006/0191681 A1* | 8/2006 | Storm et al. | 166/250.01 |
| 2006/0191682 A1* | 8/2006 | Storm et al. | 166/250.01 |
| 2006/0191687 A1* | 8/2006 | Storm et al. | 166/302 |
| 2008/0093084 A1* | 4/2008 | Knight et al. | 166/369 |
| 2008/0093085 A1* | 4/2008 | Knight et al. | 166/369 |
| 2011/0162835 A1* | 7/2011 | Gray | 166/250.17 |

FOREIGN PATENT DOCUMENTS

| | | |
|---|---|---|
| JP | 62 262628 | 11/1987 |
| JP | 05 030698 | 2/1993 |
| JP | 2001 355591 | 12/2001 |

\* cited by examiner

POWER SUPPLY AND CONTROL UNIT, PARTICULARLY FOR SUBMERSED ELECTRIC MOTORS

BACKGROUND OF THE INVENTION

The present invention relates to a power supply and control unit particularly for submersed electric motors.

As is known, in order to reduce waste and improve extraction efficiency, the electric motors with which submersed pumps are equipped are increasingly often mated with electronic power supplies that allow to improve their management.

Electronic power supplies are generally constituted by static frequency converters and by control devices that allow to automatically manage the performance of the pump in relation to the requirements. In particular, they allow to modulate the speed of the pump as a function of water demand, allowing a significant energy saving and considerably reducing the stress of the pump, with consequent extension of its useful life.

In order to make such submersed electric motors compact and to reduce problems of electromagnetic compatibility, the electronic power supply is generally placed as close as possible to the electric motor and, in some commercially available models, is even incorporated in a single metallic jacket that includes both.

To facilitate the cooling of the electronic power supply, inside the jacket there are particular heat sinks whose shape is substantially complementary to the shape of the internal surface of the enclosure.

Those heat sinks are essentially metallic extruded members that are joined to the electronic components that are most subject to heating and are simultaneously rested against the internal wall of the jacket.

Although such construction is commonly used, it can nonetheless be improved.

It must in fact be noted that the contact between the heat sink and the internal surface of the jacket certainly cannot be perfect, and such imperfect contact affects the capacity to dissipate heat.

Also, with a traditional heat sink, it is not possible to simultaneously affect all the electronic components that during operation are subjected to a temperature increase.

Moreover, it must be noted that as a function of their characteristics, submersed electric motors have different dimensions. As a consequence of this fact, it is necessary to provide heat sinks with the most disparate sizes: a fact that is onerous both in terms of increase in constructive difficulties and in terms of cost increase.

OBJECTS OF THE INVENTION

The aim of the invention is to solve the problems described above, providing a power supply and control unit particularly for submersed electric motors that is capable of dissipating, in an optimum manner, the heat generated inside it.

Within the scope of the above described aim, a particular object of the invention is to provide a power supply and control unit that uses a heat dissipation means that is universally suitable for any model of submersed electric motor.

Another object of the invention is to provide a power supply and control unit that has a heat dissipation means that is easy to install and is particularly effective.

Another object of the invention is to provide a power supply and control unit that has a dissipation means that is advantageous from a purely economic standpoint.

SUMMARY OF THE INVENTION

This aim, these objects and others that will become better apparent hereinafter are achieved by a power supply and control unit, particularly for submersed electric motors, comprising an enclosure that can be jointly connected to the motor of a submersed electric pump, said enclosure forming a hermetic chamber that contains at least one electronic power supply that can be connected to said motor, said power supply and control unit being characterized in that it comprises a heat exchange means in the liquid state that is suitable to transfer to said enclosure the heat generated by said electronic power supply, said heat exchange means in the liquid state filling completely the empty space within said hermetic chamber.

BRIEF DESCRIPTION OF THE DRAWINGS

Further characteristics and advantages will become better apparent from the description of preferred but not exclusive embodiments of a power supply and control unit according to the invention, illustrated by way of non-limiting example in the accompanying drawings, wherein.

DETAILED DESCRIPTION

Figure 1:
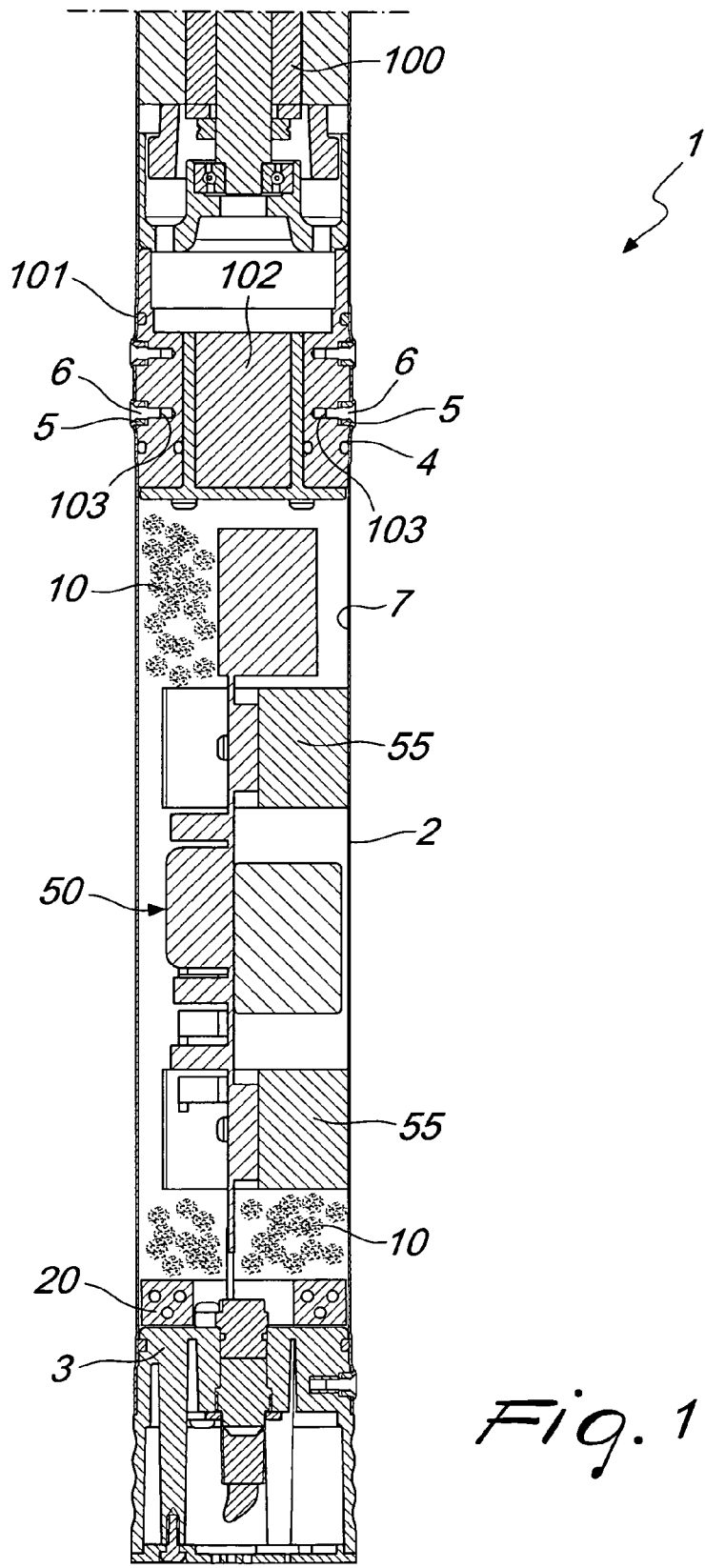
FIG. 1 is a partially sectional schematic view of a power supply and control unit according to the invention.

With reference to the cited figures, a power supply and control unit, particularly for submersed electric motors, is generally designated by the reference numeral 1.

The power supply and control unit 1 includes an enclosure 2, preferably made of corrosion-resistant metal, which can be jointly connected to the motor 100 of a submersed electric pump.

In the specific case, the enclosure 2 is constituted by a substantially cylindrical body that is closed at one end by a removable hermetic plug 3.

At the free end of the enclosure 2 there is instead a fixing edge 4 which is shaped so as to be able to axially engage on the bottom 102 of the motor 100 until it abuts against the jacket 101 thereof.

The enclosure 2 is associated with the motor 100 by a locking or fastening means that is constituted by a plurality of through holes 5, which are formed in the fixing edge 4, and by a plurality of threaded members 6, which are inserted inside them.

The threaded members 6, constituted for example by simple screws, engage corresponding female threads 103 formed on the bottom 102.

The enclosure 2, by engaging on the bottom 102, forms a hermetic chamber 7. An electronic power supply 50 is accommodated inside the hermetic chamber 7 and is connected to the motor 100.

According to the invention, the power supply and control unit 1 includes a heat exchange means 10 in the liquid state, i.e., a liquid coolant, that completely fills the empty space within the hermetic chamber 7 and is adapted to transfer the heat generated by the electronic power supply 50 to the enclosure 2.

The enclosure 2, which during use of the submersed electric pump is completely immersed in the liquid to be aspirated, dissipates the heat permanently.

The liquid heat exchange means 10 is constituted by a bath of dielectric coolant, particularly oil for food use, which is inserted within the hermetic chamber 7 so as to touch simultaneously both the outer surface of the electronic power supply 50 and the inner surface of the hermetic chamber 7.

In order to ensure correct operation of the power supply and control unit 1, a substantially dry, i.e. moisture-free, dielectric coolant is used.

To exclude the presence of air, the liquid is injected into the hermetic chamber 7 after providing vacuum inside it.

The electronic power supply 50 is preferably provided with hermetic electronic components, which are per se known, and some of which are also equipped with finned heat sinks, not shown in the accompanying figures.

The heat sinks facilitate the cooling of the electronic components, facilitating heat exchange with the dielectric coolant.

Generally, the electronic power supply 50 includes at least one static frequency converter, which modulates the speed of the motor 100, and a suitable control logic system, which drives the assembly.

The electronic power supply 50 and the motor 100 are wired by a connection means, such as a sealed pin 70, or by hermetic cable guides, not shown in the figures.

In the hermetic chamber 7, the electronic power supply 50 rests on an insulating support 55, which simply supports it and keeps it correctly suspended in the heat exchange means in the liquid state 10.

The power supply and control unit 1 also preferably includes an expansion compensation means for compensating for the expansion of the dielectric coolant. The expansion compensation means allows, if necessary, to reach very high operating temperatures by elastically absorbing the increases in volume of the liquid that fills the hermetic chamber 7.

The expansion compensation means comprises an elastically compressible member 20, which is inserted within the hermetic chamber 7. This member can be constituted, for example, by a body having a monolithic structure and made of closed-cell rubber.

Figure 3:
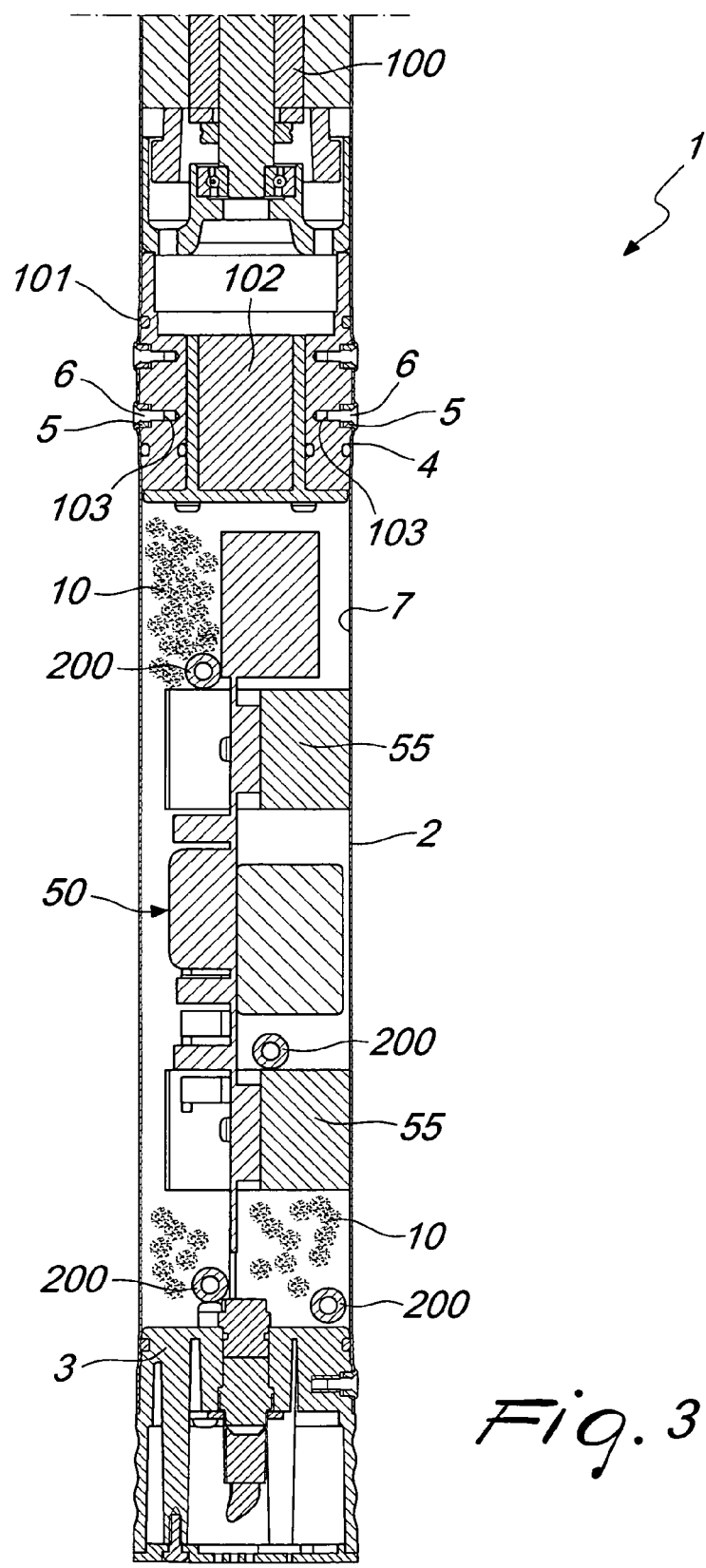
FIG. 3 is a schematic and partially sectional view of a further embodiment of a power supply and control unit according to the invention.

According to a further embodiment of the invention, illustrated in FIG. 3, the expansion compensation means is constituted by a plurality of elastically compressible members 200, which are arranged at random in the hermetic chamber 7.

Figure 4:
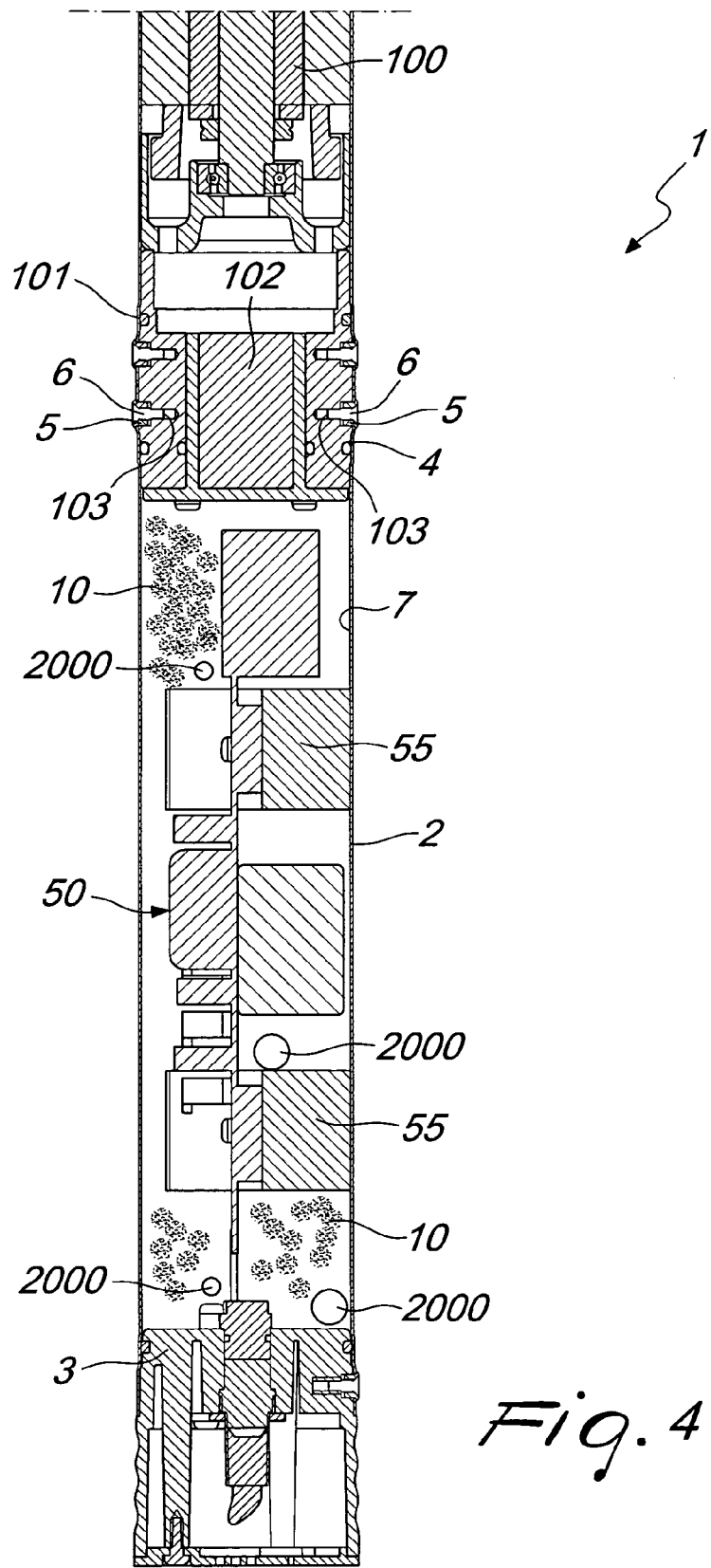
FIG. 4 is a schematic and partially sectional view of still a further embodiment of a power supply and control unit according to the invention.

According to still a further embodiment of the invention, illustrated in FIG. 4, the expansion compensation means is constituted by a plurality of bubbles 2000 of inert gas that are dispersed within the liquid heat exchange means 10.

According to still a further embodiment of the invention, not shown in the accompanying figures, at least one portion of one of the walls of the hermetic chamber 7 is replaced by an elastically deformable membrane.

Figure 2:
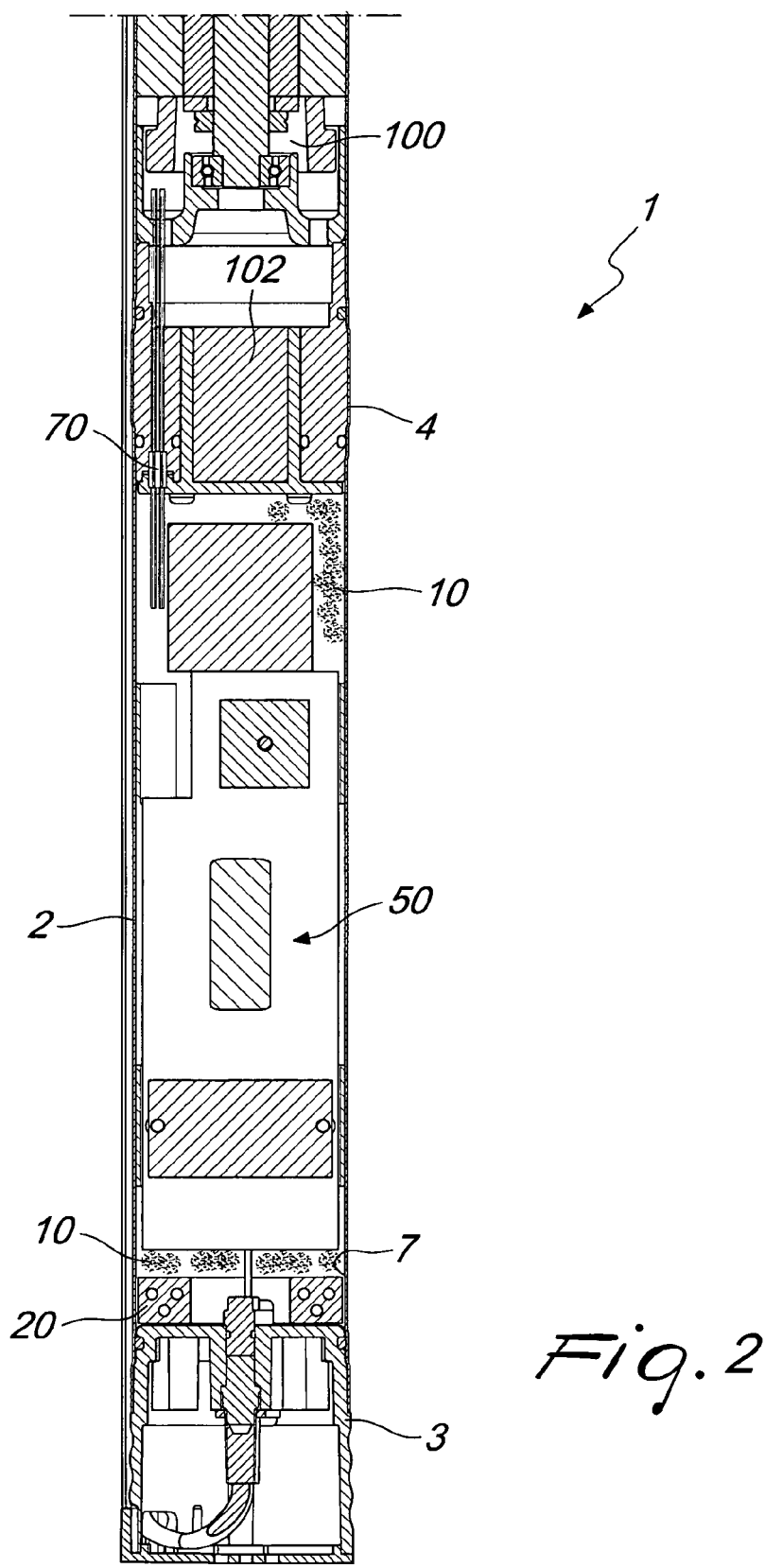
FIG. 2 is another schematic and partially sectional view of the power supply and control unit of the preceding figure.

In the embodiments shown in FIGS. 3 and 4, the components that correspond to the ones already described with reference to the embodiment shown in FIGS. 1 and 2 have been designated by the same reference numerals.

In the power supply and control unit 1, the heat generated by the electronic power supply 50 is dissipated exclusively via the liquid heat exchange means 10. The liquid heat exchange means 10 is used as a single means for the heat exchange with the enclosure 2 and for cooling the electronic power supply 50 by the convective motions that generate a continuous circulation.

In practice it has been found that the control and power supply unit particularly for submersed electric motors, according to the invention, fully achieves the intended aim and objects, since it ensures the possibility to dissipate in an optimum manner the heat generated by the electronic power supply.

In particular, the power supply and control unit uses heat dissipation means that is universally suitable for any kind of submersed electric motor and is particularly advantageous economically.

The power supply and control unit thus conceived is susceptible of numerous modifications and variations, all of which are within the scope of the inventive concept; all the details may furthermore be replaced with other technically equivalent elements.

In practice, the materials used, so long as they are compatible with the specific use, as well as the contingent shapes and dimensions, may be any according to the requirements and the state of the art.

This application claims the priority of Italian Patent Application No. VI2008A000242, filed on Oct. 15, 2008, the subject matter of which is incorporated herein by reference.

The invention claimed is:

1. A power supply and control unit, particularly for submersed electric motors, comprising an enclosure that can be jointly connected to the motor of a submersed electric pump, said enclosure forming a hermetic chamber that contains at least one electronic power supply that can be connected to said motor, said power supply and control unit including a dielectric coolant liquid that is suitable to transfer to said enclosure the heat generated by said electronic power supply, said dielectric coolant liquid filling completely said hermetic chamber, said dielectric coolant liquid simultaneously contacting an outer surface of said electronic power supply and an inner surface of said hermetic chamber, further comprising expansion compensating means for compensating for expansion of said dielectric coolant liquid.

2. The power supply and control unit according to claim 1 wherein said dielectric coolant liquid comprises oil for food use, said oil being substantially dry.

3. The power supply and control unit according to claim 1, wherein said expansion compensating means comprises at least one elastically compressible member that is inserted within said hermetic chamber.

4. The power supply and control unit according to claim 1, wherein said expansion compensating means comprises a plurality of inert gas bubbles dispersed within said dielectric coolant liquid.

5. The power supply and control unit according to claim 1, wherein said expansion compensating means comprises an elastically deformable membrane, which at least partially forms one of a plurality of walls of said hermetic chamber.

6. The power supply and control unit according to claim 1, further comprising an insulating support that is suitable to support said electronic power supply inside said hermetic chamber.

7. The power supply and control unit according to claim 1, wherein said electronic power supply comprises a plurality of hermetic electronic components.

8. The power supply and control unit according to claim 7, wherein said electronic power supply comprises a plurality of heat sinks that are joined to said electronic components.

9. The power supply and control unit according to claim 1, wherein said electronic power supply comprises at least one static frequency converter that is suitable to modulate the speed of said motor.

10. The power supply and control unit according to claim 1, wherein said electronic power supply comprises a control logic unit.

11. The power supply and control unit according to claim 1, further comprising a connection means for connecting said electronic power supply to said motor.

12. The power supply and control unit according to claim 11, wherein said connection means comprises at least one sealed ph.

13. The power supply and control unit according to claim 11, wherein said connection means comprises at least one hermetic cable passage.

14. The power supply and control unit according to claim 1, wherein said enclosure comprises a fixing edge that can be coupled to a jacket by means of locking or fastening elements.

15. The power supply and control unit according to claim 14, wherein said locking or fastening elements comprise at least one through hole that is formed in said fixing edge and a threaded member that is arranged inside said through hole, said threaded member engaging a corresponding female thread that is formed on the bottom of said motor.

16. he power supply and control unit according to claim 1, wherein said expansion compensating means is configured to elastically absorb increases in volume of the coolant liquid that fills the hermetic chamber.

* * * * *